United States Patent

Gerow

[15] 3,661,602
[45] May 9, 1972

[54] SILANE-STABILIZED SILICATE FOAMS

[72] Inventor: Stephen A. Gerow, Glen Mills, Pa.

[73] Assignee: E. I. du Pont de Nemours and Company, Wilmington, Del.

[22] Filed: July 13, 1970

[21] Appl. No.: 54,573

[52] U.S. Cl. ................................................106/75, 106/84
[51] Int. Cl. .........................................................C04b 35/16
[58] Field of Search ...........................106/74, 84, 75, 40

[56] References Cited

UNITED STATES PATENTS

| | | | |
|---|---|---|---|
| 3,136,645 | 6/1964 | Dess | 106/75 |
| 3,493,401 | 2/1970 | Schutt et al. | 106/84 |
| 3,549,395 | 12/1970 | Sears et al. | 106/84 |

*Primary Examiner*—James E. Poer
*Attorney*—Don M. Kerr

[57] ABSTRACT

Stable aqueous foams prepared from aqueous solutions of alkaline ionic silicates containing a cationic surface-active onium compound and an alkyl silane, and optionally containing colloidal amorphous silica and a latent acid or salt gelling agent. Rigid foams are obtained by setting the aqueous foams with a salt or acid, then drying the set foam. Inclusion of the silanes increases foamability of the solution, stability of the wet foam, and water resistance and strength of the dried foam.

13 Claims, No Drawings

SILANE-STABILIZED SILICATE FOAMS

BACKGROUND OF THE INVENTION

1. Field of the Invention

This invention relates to stabilized aqueous fluid or plastic foams of alkaline ionic silicates, such as sodium silicate, and to rigid foams obtained by setting and drying the aqueous foams.

2. Prior Art

Before this invention, V. W. Weidman and P. C. Yates discovered that aqueous compositions of alkaline ionic silicates containing a cationic surface-active nitrogen-containing onium compound, and optionally containing colloidal amorphous silica and a latent salt or acid gelling agent such as formamide or ethylene carbonate, could be foamed to provide aqueous fluid or plastic foams. These foams were stable, and generally could be blended with fillers, e.g. perlite or glass fibers, and/or mechanically worked, e.g. pumped, sprayed, or molded, without undue collapse. Further, the foams, (both filled and unfilled) could be set (by action of the latent salt or acid or by treatment with an acidic material such as $CO_2$) and dried, without undue collapse, to provide stable, rigid dried foams. Consequently, the foams were useful in a variety of ways, e.g. as fire-fighting compositions, high-temperature-resistant binders, and low-density heat and sound insulation.

The Weidman and Yates discovery forms the basis for commonly assigned application Ser. No. 779,275 filed in their names on Dec. 21, 1968.

SUMMARY OF THE INVENTION

This invention involves the discovery that inclusion of certain silanes in the foamable compositions just described increases the foamability of the compositions and further stabilizes the wet foams against collapse during mechanical working and drying. Inclusion of the silanes also increases the strength and water resistance of the dried foams. Also, when used at relatively high concentrations (described below) the silanes result in formation of a hard outer layer or crust on a shaped body of the dried foam, thereby increasing its impact strength.

Silanes which can be used to provide these improvements include those of the formula:

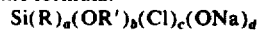     I.

where
$a = 1$ or 2
$b = 0, 1, 2$ or 3
$c = 0, 1, 2$ or 3
$d = 0$ or 1
$a + b + c + d = 4$
$b + c = 2$ or 3
R = alkyl of one to four carbon atoms or aminoalkyl of one to four carbon atoms, and
R' = hydrogen or alkyl of one to four carbon atoms.

In the formula, the requirement that $b + c = 2$ or 3 assures that there will be at least two hydroxyl groups, or groups hydrolyzable to hydroxyl groups (chloro or alkoxy) attached to the silicon atom. It is believed that the two groups permit the silane to be compatible with the silicate ion.

In one generic embodiment, then, this invention can be defined as an improved aqueous plastic or fluid foam of an alkaline ionic silicate containing a cationic surface-active nitrogen-containing onium compound and a stabilizing amount of a silane of Formula I. The foam optionally also contains colloidal amorphous silica and a latent salt or acid gelling agent.

In another generic embodiment the invention is an improved rigid foam obtained by setting the aqueous foam of this invention with an acid or salt gelling agent, then drying the set foam. The rigid foam can contain inert solid fillers. The fillers are incorporated into the aqueous foam prior to setting.

DESCRIPTION OF PREFERRED EMBODIMENTS

The presently preferred specific embodiments are foams of sodium silicate which contain mineral wool and expanded perlite fillers, hexadecyl trimethylammonium chloride surfactant, and sodium methyl siliconate [$Si(CH_3)(OH)_2(ONa)$] stabilizer. For the dried foams, the product compositions (in weight percent) are as follows:

| Component | Preferred | Range |
|---|---|---|
| Sodium silicate | 23% | 15–30% |
| Surfactant | 0.4% | 0.2–0.5% |
| Stabilizer | 0.5% | 0.2–2.0% |
| Water | 10% | 0–15% |
| Mineral Wool | 4% | 2–10% |
| Perlite | 63% | 40–70% |

Preparation of these foams is exemplified by the following recipe:

1. To 200 parts of aqueous sodium silicate solution (37.9 percent solids, $SiO_2$ to $Na_2O$ mol ratio of 3.25) add 28.5 parts water.
2. Add 5.8 parts sodium methyl siliconate.
3. Add 2.3 parts hexadecyl trimethyl ammonium chloride.
4. Whip until a foam is formed.
5. Blend in 208 parts expanded perlite and 11.8 parts mineral wool.
6. Mold into desired shape.
7. Set by contacting the shaped foam with carbon dioxide.
8. Dry the product.

Typical properties of these dried foams are as follows:

| Property | Range |
|---|---|
| Density (lb./ft.$^3$) | 11–15 |
| Compressive strength (psi at 5% deformation) | 30–140 |
| Thermal conductivity (Btu. - in./hr. - ft.$^2$ - ° F.) at mean temp. of: | |
| 300° F. | .4–.5 |
| 500° F. | .5–.7 |
| 700° F. | .6–.8 |

GENERAL DESCRIPTION

The alkaline ionic silicates which can be used are the water-soluble silicates of monovalent bases which have a basic dissociation constant at 25° C. in excess of $10^{-2}$. Included among these are the silicates of lithium, sodium, and potassium, and the silicates of strong monovalent bases, such a tetramethylammonium hydroxide, tetraethanolammonium hydroxide, and guanidinium hydroxide. The mole ratio of $SiO_2$ to anhydrous basic oxide (e.g. $SiO_2$ to $Na_2O$) in the silicates will be between about 3 and 5. $SiO_2$ can be present in solutions of alkaline ionic silicates in a mole ratio in excess of 5, but such excess silica will be in the form of colloidal amorphous silica particles, and should be treated as such in calculating compositions.

Colloidal amorphous silica, when used, can be incorporated in the form of an aqueous sol of discrete silica particles in the size range of about 5 to 200 millimicrons. The mol ratio of colloidal silica to silicate ion should be no greater than about 3 to 1, preferably no greater than 2.5 to 1.

In preparing mixtures of colloidal silica aquasols with the alkaline ionic silicates of the invention, certain precautions have been found necessary. Generally speaking, alkaline lithium silicates are compatible with virtually any particle size colloidal amorphous silica sol, and in any proportions. This tends also to be true of potassium silicates, tetramethylammonium silicates and tetraethanolammonium silicates. Sodium silicates of mole ratios of silica to $Na_2O$ greater than about 4 are also generally compatible with a wide range of particle sizes and concentrations of colloidal amorphous silica, but sodium silicates having lower ratios than this sometimes gel the colloidal amorphous silica, particularly if high concentrations of colloidal amorphous silica and small particle sizes are employed. Guanidine silicate shows somewhat the same problem. This can often be minimized by diluting the colloidal amorphous silica with water or by selecting a larger particle-sized colloidal amorphous silica. In some instances, it may be desirable to add a small additional amount of stabilizing base, such as sodium hydroxide, quanidine hydroxide, etc. to the colloidal amorphous silica sol prior to adding the alkaline ionic silicate. It is usually desirable in doing this to add an amount of strong base which approximately equals in molar concentration the molar concentration of surface silanol groups of the amorphous silica sols.

The total silica content in the foamable compositions and wet foams should be at least 20 percent by weight, based on the weight of water plus alkaline ionic silicate plus colloidal silica, if any. At least 5 percent by weight (same basis) should be silica derived from the alkaline ionic silicate. The upper limit of $SiO_2$ content will depend upon a variety of factors, e.g. the particular ionic silicate used and the particle size of the colloidal silica, if any, but in general will not exceed 40 percent by weight (same basis).

Cationic surface-active nitrogen-containing onium compounds (hereinafter sometimes referred to as foaming agents) which can be used include such compounds containing one or two alkyl chains of more than seven carbon atoms. Such compounds are described fully in the Encyclopedia of Chemical Technology, by Kirk & Othmer, Interscience Encyclopedia Inc. (1952) in Vol. 9, pp. 592–593. Representative of these compounds are substituted ammonium, imidazolinium, hydroxylammonium and guanidinium compounds in which the substituents are hydrogen, straight- or branched-chain aliphatic groups of one to 24 carbon atoms, cycloalkyl, aryl, and alkyl substituted aryl groups. The nitrogen can be part of the ring in a heterocyclic structure.

Representative of these compounds are: caprylyl trimethyl ammonium chloride (Aliquat 2); oleyl trimethyl ammonium chloride (Aliquat 11); oleyl-linoleyl trimethyl ammonium chloride (Aliquat 15); dilauryl dimethyl ammonium chloride (Aliquat 204); lauryl heterocyclic tertiary amine (Amine C); cetyl dimethyl ethyl ammonium bromide (Ammonyx DME); cetyl dimethyl benzyl ammonium chloride (Ammonyx T); lauryl trimethyl ammonium chloride (Arquad 12–50); cetyl trimethyl ammonium chloride (Arquad 16–50); stearyl trimethyl ammonium chloride (Arquad 18–50); quaternized 2-amino pentadecane (Arquad L–15); dicoco dimethyl ammonium chloride (Arquad 2C–50); N-cetyl ethyl morpholinium ethosulfate (Atlas G 263); alkenyl dimethyl ethyl ammonium bromide (Barquat OE–50); lauryl isoquinolinium bromide (Barquat IB–75); myristyl dimethyl benzyl ammonium chloride (BTC 1750); stearamido propyl dimethyl B-hydroxyethyl ammonium phosphate (Catanac SP); tetradecyl pyridinium bromide (Fixanol VR); heptadecenyl imidazolinium bromide (Intexan HB–50); quaternary substituted imidazoline of oleic acid (Monaquat OIBC); substituted imidazoline of myristic acid (Monazoline M); coco fatty dialkyl benzyl ammonium chloride (Quatrene CB); fatty glyoxalidinium chloride (Quatrene 0–56); soya fatty dialkyl benzyl ammonium chloride (Quatrene SFB); 1-hydroxyethyl 2-heptadecenyl imidazoline hydrochloride (Romine BTQ); and lauryl dimethyl benzyl ammonium chloride (Vantoc CL).

The amount of onium surfactant to be used depends upon the amount of "reactive silica" present in the foamable composition. The "reactive silica" includes the silica in the alkaline ionic silicate plus the silica which is on the surface of the colloidal silica particles (if any) and which is therefore available for reaction. The percentage of the total colloidal silica which should be considered reactive silica is equal to $218/D$, where $D$ is the average colloidal particle size in millimicrons. The mol ratio of onium surfactant to reactive silica should be between 0.002 and 0.05, preferably 0.004 to 0.04. Below 0.002, the wet foams collapse rather rapidly. More than 0.05 can be used, but is unnecessary.

The amount of silane which is effective to stabilize the wet foam and which can be tolerated varies with the particular silane used and the nature and concentrations of other components of the system. For any given system, therefore, the useful range of silane concentrations must be determined by experiment. It has been found that as little as 1 part by weight of either sodium methyl siliconate, dimethyl diethoxy silane, or methyl trichlorosilane per thousand parts by weight of aqueous sodium silicate, will produce a stable foam. For some of the silanes, the upper limit is determined by only economics. For example, as much as 1.5 parts of sodium methyl siliconate per part of sodium silicate can be added without deleterious effect upon the subsequent foam. On the other hand, quantities of dimethyl diethoxy silane in excess of one part per 40 parts of sodium silicate cause the solution to gel without foaming. Similarly, methyl trichlorosilane in quantities greater than three parts per 50 parts of sodium silicate causes gelling without foaming.

The foamable composition can also contain a latent salt or acid gelling agent. These are materials which hydrolyze in aqueous solution to liberate an acid or ionized salt. Suitable materials include amides, imides, esters, and acid anhydrides. They can be derived from either organic or inorganic acids. For example, esters of phosphoric and acetic acids can be used. Preferred latent gelling agents include formamide, ethylene carbonate, ethyl acetate, 2-hydroxy ethyl acetate, and the diacetate and triacetate esters of glycerol. The acidic moiety of the latent gelling agent should be more acidic than silicic acid, i.e. have a dissociation constant greater than $10^{-10}$.

The compositions are foamed by whipping or beating air or another inert, water-insoluble gas, such as a "Freon" fluorocarbon, into the composition.

After foaming, but before setting, various inert solid fillers can be incorporated into the foams, in amounts up to about 15 parts by weight per one part by weight of total silica. Representative of suitable fillers are particulate additives such as the various clays including the expanded clay aggregates, expanded perlite and vermiculite, pigmentary potassium titanate, and gypsum; and fibers such as plastic fibers, vegetable fibers such as paper pulp, bleached and unbleached wood pulp, glass fibers, metal fibers, ceramic fibers, mineral fibers such as asbestos, and synthetic inorganic fibers such as rock wool, slag wool, and the alumino-silicate fibers including "Fiberfrax" (Carborundum Co.), "Thermoflex" (Johns-Manville Co.), and "Kaowool" (Babcock and Wilcox Co.). Other suitable additives to the foams of this invention include materials which serve as binding agents such as polymers, including phenol formaldehyde and urea formaldehyde, as well as fugitive organic binders such as sugars, starches, resins, and gums.

Until such time as it is desired to set the foam, the pH of the system should be maintained above 9, preferably between 10 and about 12.5. At pH below 9, gelling begins prematurely, and the composition will not foam satisfactorily.

It is generally desirable to mold the wet foams into desired shapes prior to setting. As indicated above, the foams can be mechanically worked without collapse of the foam bubbles.

If a latent gelling agent is included in the foamable composition, setting can be accomplished generally by letting the wet foam stand at room temperature until the gelling agent hydrolyzes. If desired, setting can be accelerated by heating the foam. Generally, heating beyond about 200° F. is unnecessary.

If a latent gelling agent is not used, setting can be produced by addition of an acidic gas or an aqueous solution of an acid. If the latter is used, it must be blended into the foam before molding, and molding must be carried out rapidly before setting occurs. For this reason it is preferred to use an acidic gas such as carbon dioxide or sulfur dioxide.

The amount of gelling agent required will usually be in the range of 0.05 to 0.9 acid equivalents per equivalent of base in the mixture. The larger amounts are required for the latent gelling agents or for systems containing high concentrations of colloidal silica.

Foams of the invention can contain other ingredients than those already mentioned. For example, various materials which form insoluble chemical bonds with the silicate can be included to further increase water resistance. Examples of such materials include magnesium oxide, zinc oxide, fly ash (calcium silicate), Portland cement, and alumino silicate clays.

The foams, both in the wet stage and after setting, are characterized by very fine, uniform, pore structure and low density. Pore diameter is generally no more than 1 millimeter, and average diameter is usually much less. Densities of both the wet and dried foams range from 3 to 40 lb./ft.$^3$. The lower densities are preferred for thermal insulation applications, but the higher densities are preferred for applications in which substantial loads must be borne by the foam. The density of filled bodies bonded by these foams will of course vary with the density of filler material, but the density of the foams themselves fall within the range 3 to 40 lb./ft.$^3$.

The wet foams of the invention are stable, even without added filler. They do not collapse and drain on standing in air at ambient temperatures for at least 24 hours.

The dried foams are also characterized by high surface area, in the range 300 to 1,000 m.$^2$/g. as determined by nitrogen adsorption. This makes them desirable as catalyst supports.

Foams of the invention can also be employed either with or without fillers to prepare wall board and ceiling tile, thermal insulation, and sound insulation. The wet foams can be prepared continuously from a foam generator, sprayed on surfaces where insulation is desired, and set and dried in place. They can also be used as fire fighting compositions by blanketing the burning area with the foam.

The following examples will further illustrate the invention. All parts are parts by weight unless other-wise stated.

EXAMPLE 1

A 5-quart Hobart mixer kettle is charged with 87.5 parts of sodium silicate (8.9% $Na_2O$, 29.0% $SiO_2$, 62.1% $H_2O$; of specific gravity 41.6° Be' at 60° F. and having an approximate viscosity of 250 cp. at 78° F.), 12.5 parts of distilled water, 2.5 parts of 30 percent sodium methyl siliconate and one part of 50 percent hexadecyl-trimethylammonium chloride. Upon adding the surfactant a white gel is produced. The mixture is blended for 10 seconds with a wire-ship beater at low speed and then beat at high speed for 10 minutes to produce a stable foam. The foam occupies a space 14 times greater than that of the starting mixture. It has a density of 9.8 pounds per cubic foot in this wet state.

To the above foam is added 100 parts of ultra-fine expanded perlite having a density of 2.5 pounds per cubic foot. The mixture is blended for twenty seconds at low speed to produce a low density, viscous mass. Specimens are molded and immediately subjected to an atmosphere of carbon dioxide gas for a period of 5 minutes. Specimens are air-dried for 16 hours and then oven-dried at a temperature of 50° C. for an additional 8 hours. A low density insulation composition is obtained by this procedure, and is characterized as follows:

| | |
|---|---|
| Density, lb./cu. ft. | 14.0 |
| Compressive strength, p.s.i. at 5% deformation | 114 |
| Lineal shrinkage on drying, % | <1 |

Water resistance, 8-hour boil followed by 16-hour immersion:

| | |
|---|---|
| Loss in volume, % | <0.25 |
| Density lb./cu. ft. | 12 |
| Compressive strength, p.s.i. at 5% deformation | 50 |

EXAMPLE 2

A 5-quart Hobart mixer kettle is charged with 175 parts of sodium silicate (8.9% $Na_2O$, 29.0% $SiO_2$, 62.1% $H_2O$; of specific gravity 41.6° Be' at 60° F. and having an approximate viscosity of 250 cp. at 78° F.), 25 parts of distilled water, 5 parts of 30 percent sodium methyl siliconate and 2 parts of 50 percent hexadecyltrimethylammonium chloride. Upon adding the surfactant a white gel is produced. The mixture is blended for 10 seconds with a wire-ship beater at low speed and then beat at high speed for 10 minutes to produce the stable foam. The foam occupies a space fourteen times greater than that of the starting mixture. It has a density of 9.8 pounds per cubic foot in this wet state. To the above foam was added 10 parts of mineral wool and mixed for 1 minute at high speed and 182 parts of ultra-fine expanded perlite having a density of 2.5 pounds per cubic foot. The mixture is blended for 20 seconds at low speed to produce a low density, viscous mass. Specimens are molded and immediately subjected to an atmosphere of carbon dioxide gas for a period of 30 seconds. Specimens are air-dried for 16 hours and then oven-dried at a temperature of 200°F. for an additional 8 hours. A low density insulation composition is obtained by this procedure, and is characterized as follows:

| | |
|---|---|
| Density, lb./cu. ft. | 12.2 |
| Compressive strength, p.s.i. at 5% deformation | 100 |
| Lineal shrinkage on drying, % | <1 |

| Pot Life Time, (min.) | Density, (lb./cu.ft.) | Compressive Strength, p.s.i. at 5% deformation |
|---|---|---|
| 10 | 12.2 | 99.0 |
| 15 | 12.2 | 98.2 |
| 20 | 12.2 | 100.0 |
| 25 | 12.2 | 98.6 |

EXAMPLE 3

The procedure of Example 2 is repeated except that 5 parts by weight of sodium methyl siliconate is omitted. The product is characterized as follows:

| | |
|---|---|
| Density, lb./cu. ft. | 12.2 |
| Compressive strength, p.s.i. 5% deformation | 85 |
| Lineal shrinkage on drying, % | <1 |

| Pot Life Time, (min.) | Density (lb./cu.ft.) | Compressive Strength p.s.i. at 5% deformation |
|---|---|---|
| 10 | 12.2 | 85.3 |
| 15 | 12.2 | 60.5 |
| 20 | 12.2 | 58.1 |
| 25 | 12.2 | 55.5 |

EXAMPLE 4

The procedure of Example 1 is repeated except that the foam is blended with 60 parts of ultra-fine perlite powder (2.5 lb./cu.ft. density) together with 40 parts of fly ash. Specimens are formed in a mold and immediately subjected to an atmosphere of carbon dioxide gas for a period of five minutes followed by air-drying for 60 hours.

A rapidly set low density insulation is obtained by this procedure, and is characterized as follows:

| | |
|---|---|
| Density, lb./cu.ft. | 12 |
| Compressive strength, p.s.i. at 5% deformation | 51 |
| Lineal shrinkage on drying, % | <1 |

EXAMPLE 5

The procedure of Example 1 is repeated except that two hundred parts of sodium silicate are mixed with 5 parts of 30 percent sodium methyl siliconate and 5 parts of the 50 percent hexadecyl trimethylammonium chloride. The foam expands about 7 times the volume of that of the substituents and has a density of 20 pound per cubic foot. The filled foam is processed as in Example 1 to give a shape which has the following properties:

| | |
|---|---|
| Density, lb./cu.ft. | 25 |
| Compressive strength, p.s.i. at 5% deformation | 161 |
| Lineal shrinkage on drying, % | <1 |

EXAMPLE 6

The procedure of Example 3 is repeated using a filler mixture consisting of 95 parts of ultra-fine perlite powder (2.5 lb./cu.ft. density) and 5 parts of one-half inch strands of fiberglass staple as a replacement for part of the perlite.

Specimens are formed in a mold and immediately exposed to an atmosphere of carbon dioxide gas for a period of 5 minutes.

A fast-set insulation product is obtained by this procedure that is characterized as follows:

| | |
|---|---|
| Density, lb./cu.ft. | 31 |
| Compressive strength, p.s.i. at 5% deformation | 235 |
| Lineal shrinkage on drying, % | <1 |

EXAMPLE 7

With stirring, 175 parts of sodium silicate (8.7% $Na_2O$: 28.47% $SiO_2$: 62.9% $H_2O$ of specific gravity 40.6° Be' at 60° F. and having an approximate viscosity of 120 cp. at 78° F.) are blended with a mixture consisting of 25 parts of distilled water, 10 parts of formamide and 0.25 parts of dimethyldiethoxysilane. Two parts of a 50 percent solution of hexadecyl trimethylammonium chloride are added and the mixture is blended for 15 seconds in a Hobart mixer kettle. Following this, the mixture is beaten for 8 minutes with a wire-ship beater at maximum speed to produce a foam. To the foam is added 100 parts of ultra-fine perlite powder (2.5 lb./cu.ft. density) and 10 parts of mineral wool. The filler is blended thoroughly into the foam using the Hobart mixer and paddle. Specimens are formed in a mold and subjected to heat in an oven at 60° C. for 10 minutes.

A quick set low density insulation is obtained by this procedure, and is characterized as follows:

| | |
|---|---|
| Density, lb./cu.ft. | 19 |
| Compressive strength, p.s.i. at 5% deformation | 100 |
| Lineal shrinkage on drying, % | <1 |

EXAMPLE 8

The procedure of Example 7 is repeated using 175 parts of sodium silicate (8.9% $Na_2O$: 29.0% $SiO_2$: 62.1% $H_2O$) of specific gravity 41.6° Be' at 60° F. and having an approximate viscosity of 250 cp. at 78° F.

As in Example 5, a quick-setting low density insulation product is obtained having the following balance of properties:

| | |
|---|---|
| Density, lb./cu.ft. | 22 |
| Compressive strength, p.s.i. at 5% deformation | 100 |
| Lineal shrinkage on drying, % | <1 |

EXAMPLE 9

With stirring, 175 parts of sodium silicate (8.9% $Na_2O$: 29.0% $SiO_2$: 62.1% $H_2O$) are blended with 25 parts of distilled water and 5 parts of gamma aminopropyltriethoxy-silane. Two parts of a 50% solution of oleyl-linoleyl trimethylammonium chloride are first slowly blended followed by a fast whipping in a Hobart mixer kettle using a wire-ship beater for 10 minutes. Following this, 130 parts of ultra-fine perlite powder (2.5 lb./cu.ft. density) are blended into the foam using the Hobart mixer kettle and paddle. Specimens are molded and immediately subjected to an atmosphere of carbon dioxide gas for a period of 5 minutes.

By this procedure, a quick-setting insulating product is obtained that develops 60 lb./sq.in. compressive strength at 5 percent deformation within a five-minute period after foaming and is further characterized below:

| | |
|---|---|
| Density, lb./cu.ft. | 25 |
| Lineal shrinkage on drying, % | <1 |

EXAMPLE 10

The procedure of Example 1 is repeated using 175 parts of potassium silicate (12.45% $K_2O$: 26.25% $SiO_2$: 61.30% $H_2O$ of specific gravity 40.5° Be' at 60° F. and having an approximate viscosity of 325 ± 75 cp. at 77° F.), instead of the sodium silicate in Example 1.

As in Example 1, a rapidly-set low density insulation material is obtained that is characterized as follows:

| | |
|---|---|
| Density, lb./cu.ft. | 18 |
| Compressive strength, p.s.i. at 5% deformation | 70 |
| Lineal shrinkage on drying, % | <1 |

EXAMPLE 11

The procedure of Example 1 is repeated, employing the following silicate:

175 parts of guanidine silicate solution of 3.06 molality (0.924 mol ratio guanidine to silica: 38.6 percent solids: 20.2 percent silica). As in Example 1 the silicate solution was foamed, filled with perlite, molded and set with $CO_2$ to give a shape with insulating properties.

EXAMPLE 12

200 parts of lithium silicate (4.8 $SiO_2$: $Li_2O$ on a mole basis at 22 percent solids) are blended with a mixture consisting of 25 parts $H_2O$ and 5 parts of 30 percent sodium methyl siliconate. Following this, 5 parts of β-pentadecyl trimethylammonium chloride are added and the mixture is beaten as previously described in Example 1. A filler consisting of 120 parts of ultra-fine perlite (2.5 lb./cu.ft. density) is blended into the foam. Specimens are formed in a mold and immediately exposed to an atmosphere of carbon dioxide gas for a period of five minutes followed by air-drying for sixty hours. A rapid-set insulation product is obtained by this procedure that is characterized as follows:

| | |
|---|---|
| Density, lb./cu.ft. | 19 |
| Compressive strength, p.s.i. at 5% deformation | 90 |
| Lineal shrinkage on drying, % | <1 |

EXAMPLE 13

With stirring, 150 parts of potassium silicate (20.8% $SiO_2$: 8.3% $K_2O$: 70.9% $H_2O$ of specific gravity 30.2° Be' at 60° F.) and 50 parts of an ammonium stabilized colloidal silica aquasol containing 30 percent silica of an average particle size of 15 mμ, and having a pH of 9.8 and an $SiO_2$ to $NH_3$ weight ratio of 120:1 is blended with 5 parts of 30 percent sodium methyl siliconate. Three parts of a 50 percent solution of hexadecyltrimethyl ammonium chloride are added and the mixture is whipped in a Hobart mixer kettle to produce a foam.

A filler mixture consisting of 50 parts of ultra-fine perlite powder (2.5 lb./cu.ft. density) and 50 parts of coarse perlite grains (7 lb./cu.ft. density and 8-20 mesh size) is blended into the foam. Specimens are formed in a mold and immediately subjected to an atmosphere of carbon dioxide gas for a period of 10 minutes before drying in air.

A chemically set low-density insulation is obtained by this procedure, which is characterized as follows:

| | |
|---|---|
| Density, lb./cu.ft. | 15 |
| Compressive strength, p.s.i. at 5% deformation | 80 |
| Lineal shrinkage on drying, % | <1 |

EXAMPLE 14

Into a 5-quart Hobart mixing kettle is charged 100 parts of sodium silicate (8.9% $Na_2O$: 29.0% $SiO_2$: 62.1 percent water of specific gravity 41.6° Be' at 60° F. and having an approximate viscosity of 250 cp. at 78° F.), 40 parts water, 100 parts "Ludox" AS, an ammonia-stabilized colloidal silica aquasol containing 30 percent silica of an average particle size of 13 m$\mu$ and having a pH of 9.8 and an $NH_3$ to $SiO_2$ weight ratio of 1:120, and 5 parts of 30 percent sodium methyl siliconate. This mixture is stirred for 15 seconds at slow speed. Then 3 parts of a 50 percent solution of hexadecyl trimethylammonium chloride are mixed at high speed with a wire-ship beater for 10 minutes. The resulting foam occupies a space ten times that of the substituents, and has a density of about 20 lb./cu.ft. The foam has good stability and can be used in many binder applications.

| | |
|---|---|
| Compressive strength, p.s.i. at 5% deformation | 5 |
| Lineal shrinkage on drying, % | 15 |

EXAMPLE 15

The foam of Example 14 is cast in a mold and exposed to carbon dioxide gas for three minutes. A low-density shape having insulating properties is formed.

| | |
|---|---|
| Density, lb./cu.ft. | 20 |
| Compressive strength, p.s.i. at 5% deformation | 7 |
| Lineal shrinkage on drying, % | 10 |

EXAMPLE 16

The foam of Example 14 is blended with 125 parts of ultra-fine perlite having a density of 5 lbs./cu.ft. for 15 seconds at low speed in a Hobart mixer. The filled foam is cast and exposed to carbon dioxide gas for three minutes and then air-dried. The shape has the following properties:

| | |
|---|---|
| Density, lb./cu.ft. | 15 |
| Crush strength, p.s.i. at 5% deformation | 60 |
| Lineal shrinkage on drying, % | <1 |

EXAMPLE 17

Example 16 is repeated except that 55 parts of fly ash and 75 parts of ultra-fine perlite powder (2.5 lb./cu.ft. density) are employed in place of the filler. A final shape of comparable properties is obtained.

| | |
|---|---|
| Density, lb./cu.ft. | 15 |
| Crush strength, p.s.i. at 5% deformation | 65 |
| Lineal shrinkage on drying, % | <1 |

EXAMPLE 18

The procedure in Example 16 is repeated except that 20 parts of mineral wool and 90 parts of perlite are substituted for fly ash and perlite. A final shape is obtained of comparable properties.

| | |
|---|---|
| Density, lb./cu.ft. | 15 |
| Crush strength, p.s.i. at 5% deformation | 65 |
| Lineal shrinkage on drying, % | <1 |

EXAMPLE 19

Example 14 is repeated except that 100 parts of sodium silicate, 100 parts of "Ludox" AS (an ammonia-stabilized silica sol having an average particle size of about 13 m$\mu$ and 5 parts of gamma aminopropyltriethoxysilane are employed. The foam is filled and processed according to Example 15 to give a shape having insulating properties.

| | |
|---|---|
| Density, lb./cu.ft. | 20 |
| Compressive strength, p.s.i. at 5% deformation | 65 |
| Lineal shrinkage on drying, % | <1 |

EXAMPLE 20

175 parts of sodium silicate (8.7% $Na_2O$: 28.47% $SiO_2$: 62.9% $H_2O$) are blended with a mixture of 25 parts distilled water and five parts of 30 percent sodium methyl siliconate. After slowly mixing, two parts of a 50 percent solution of hexadecyl trimethylammonium chloride are added and the mixture is blended for 12 seconds in a Hobart mixer kettle. Following this, the mixture is beat for 8 minutes with a wire-ship beater at maximum speed to produce a foam. To the foam are added 15 parts of "Fiberfrax" ceramic fiber and a blend of fillers including 75 parts of ultra-fine perlite powder (2.5 lb./cu.ft. density) and 150 parts of "Veri-lite" expanded refractory clay particulate aggregate. The fillers are uniformly mixed throughout the foam binder matrix using the Hobart mixer and paddle. Specimens are molded and subjected to $CO_2$ gas for 5 minutes and then allowed to dry completely in air.

A hard, strong, tough refractory insulating material is thus produced having the following properties:

| | |
|---|---|
| Density, lb./cu.ft. | 29 |
| Compressive strength, p.s.i. at 5% deformation | 155 |
| Lineal shrinkage on drying, % | <1 |

EXAMPLE 21

The procedures of Example 20 are repeated using 1 part of methyltrichlorosilane as a replacement for 5 parts of 30 percent sodium methyl siliconate. The methyltrichlorosilane is added slowly with good agitation to the 175 parts of sodium silicate diluted with 25 parts of water. At before the foam is blended with the fillers, molded and set with $CO_2$ and dried to give a shape having refractory insulating properties.

EXAMPLE 22

A foam having a ratio of 75 percent silica to 25 percent silicate is prepared using a 5-quart Hobart mixer and a wire-ship beater. 140 parts of "Ludox" AS (an ammonia-stabilized colloidal silica aquasol containing 30 percent silica of an average particle size of 13 m$\mu$ and having a pH of 9.8 and a $NH_3$ to $SiO_2$ weight ratio of 1.25:50) are mixed with ten parts of potassium silicate having an $SiO_2$ to $K_2O$ weight ratio of 1.8:1 at a density of 12.5 lb./gal. and 5 parts of 30 percent sodium methyl siliconate. These ingredients are mixed for 10 seconds at low speed in the Hobart mixer. Two parts of a 50 percent solution of trimethylhexadecyl ammonium chloride are added to the mixture and beat for 90 seconds at high speed. A stable foam is obtained which could be filled to produce a low-density thermal insulation material.

| | |
|---|---|
| Density, lb./cu.ft. | 1.5 |
| Compressive strength, p.s.i. at 5% deformation | 0.38 |
| Lineal shrinkage on drying, % | 12 |

EXAMPLE 23

A 5-quart Hobart mixer kettle is charged with 87.5 parts of sodium silicate (8.9% $Na_2O$: 29.0% $SiO_2$: 62.1% $H_2O$ of specific gravity 41.6° Be' at 60° F. and having an approximate viscosity of 250 cp. at 78° F.), 12.5 parts of distilled water 2.5 parts of 30 percent sodium methyl siliconate and 1 part of 50 percent hexadecyltrimethyl ammonium chloride. Upon adding the surfactant a white gel is produced. The mixture is blended for 10 seconds with a wire-ship beater at low speed and then beat at high speed for 10 minutes to produce the stable foam. The foam occupies a space fourteen times greater than that of the starting mixture. It has a density of 9.8 pounds per cubic foot in this wet state.

To the above foam was added 5 parts of mineral wool and 91 parts of ultra-fine expanded perlite having a density of 2.5 pounds per cubic foot. The mixture is blended for 20 seconds at low speed to produce a low-density, viscous mass. Specimens are molded and immediately subjected to an atmosphere of carbon dioxide gas. Following this, specimens are aged for a period of at least two weeks under ambient conditions and then oven-dried at a temperature of 200° F. for an additional 8 hours. A low density insulation composition is obtained by this procedure, and is characterized as follows:

| | |
|---|---|
| Density, lb./cu.ft. | 12.5 |
| Compressive strength, p.s.i. at 5% deformation | |
| Dry | 75 |
| Wet | 65 |
| Lineal shrinkage on drying, % | <0.5 |
| Lineal shrinkage after heat soaking at 1000° F. for 24 hrs., % | 0.3 |
| Thermal conductivity, Btu/(hr.) (sq.ft.) (° F./in.) at a mean temperature of: | |
| 300° F. | 0.45 |
| 500° F. | 0.57 |
| 700° F. | 0.69 |
| Water resistance, 8-hr. boil followed by 16-hr. immersion: | |
| Loss in volume, % | <0.25 |
| Density, lb./cu.ft. | 11 |
| Compressive strength, p.s.i. at 5% deformation | 45 |

I claim:

1. In a stable, fluid or plastic aqueous foam composed essentially of water, a dissolved alkaline ionic silicate, and a cationic nitrogen-containing surface-active onium compound, the improvement which comprises inclusion of a stabilizing quantity of a silane of the formula $$Si(R)_a(OR')_b(Cl)_c(ONa)_d$$

where
$a = 1$ or $2$
$b = 0, 1, 2$ or $3$
$c = 0, 1, 2$ or $3$
$d = 0$ or $1$
$a+b+c+d = 4$
$b+c = 2$ or $3$
R = alkyl of one to four carbon atoms or aminoalkyl of one to four carbon atoms, and
R' = hydrogen or alkyl of one to four carbon atoms.

2. An improved foam of claim 1 in which the silane is sodium methyl siliconate, dimethyl diethoxy silane, gamma-aminopropyl triethoxy silane, or methyl trichlorosilane.

3. An improved foam of claim 1 in which the silane is sodium methyl siliconate.

4. In a process for making a stable, fluid or plastic aqueous foam by adding a cationic nitrogen-containing surface-active onium compound to an aqueous solution of an alkaline ionic silicate, then foaming the mixture, the improvement which comprises including in the mixture a stabilizing amount of a silane of the formula $$Si(R)_a(OR')_b(Cl)_c(ONa)_d$$

where
$a = 1$ or $2$
$b = 0, 1, 2$ or $3$
$c = 0, 1, 2$ or $3$
$d = 0$ or $1$
$a+b+c+d = 4$
$b+c = 2$ or $3$
R = alkyl of one to four carbon atoms or aminoalkyl of one to four carbon atoms, and
R' = hydrogen or alkyl of one to four carbon atoms.

5. An improved process as defined in claim 4 wherein the silane is sodium methyl siliconate, dimethyl diethoxy silane, gamma-aminopropyl triethoxy silane, or methyl trichlorosilane.

6. An improved process as defined in claim 5 wherein the silane is sodium methyl siliconate.

7. In a stable, rigid foam composed essentially of water, a gelled alkaline ionic silicate, and a cationic nitrogen-containing surface-active onium compound, the improvement which comprises inclusion in the foam prior to gellation of a stabilizing quantity of a silane of the formula $$Si(R)_a(OR')_b(Cl)_c(ONa)_d$$

where
$a = 1$ or $2$
$b = 0, 1, 2$ or $3$
$c = 0, 1, 2$ or $3$
$d = 0$ or $1$
$a+b+c+d = 4$
$b+c = 2$ or $3$
R = alkyl of one to four carbon atoms or aminoalkyl of one to four carbon atoms, and
R' = hydrogen or alkyl of one to four carbon atoms.

8. An improved foam of claim 7 in which the silane is sodium methyl siliconate, dimethyl diethoxy silane, gamma-aminopropyl triethoxy silane, or methyl trichlorosilane.

9. An improved foam of claim 7 in which the silane is sodium methyl siliconate.

10. In a process for making a stable, rigid foam by adding a cationic nitrogen-containing surface-active onium compound to an aqueous solution of an alkaline ionic silicates, then foaming the mixture, the improvement which comprises including in the mixture a stabilizing amount of a silane of the formula $$Si(R)_a(OR')_b(Cl)_c(ONa)_d$$

where
$a = 1$ or $2$
$b = 0, 1, 2$ or $3$
$c = 0, 1, 2$ or $3$
$d = 0$ or $1$
$a+b+c+d = 4$
$b+c = 2$ or $3$
R = alkyl of one to four carbon atoms or aminoalkyl of one to four carbon atoms, and
R' = hydrogen or alkyl of one to four carbon atoms, then setting the foam with an acid or salt gelling agent, then drying the foam.

11. A improved process as defined in claim 10 in which an inert solid filler is mixed with the aqueous foam prior to setting.

12. An improved process as defined in claim 10 in which the aqueous foam is set with acidic gas.

13. An improved process as defined in claim 10 in which the gas is carbon dioxide.

* * * * *